Patented Aug. 9, 1932

1,870,479

UNITED STATES PATENT OFFICE

RAYMOND F. BACON, OF BRONXVILLE, AND ISAAC BENCOWITZ, OF NEW YORK, N. Y.; SAID BENCOWITZ ASSIGNOR TO SAID BACON

RECOVERY OF SULPHUR

No Drawing.   Application filed August 2, 1930.  Serial No. 472,694.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores.

The process of the present invention involves the treatment of ore or other metallurgical raw materials or products containing pyrites or other sulphides of iron, alone or in combination with sulphides of other heavy metals with sulphur dioxide for the purpose of obtaining free sulphur.

The present invention is based on our discovery that a reaction between sulphur dioxide and ferrous sulphide or pyrites is promoted when conducted in the presence of one or more metal salts containing oxygen.

When ferrous sulphide or pyrites or a mixture of these two compounds alone or in combination with other heavy metal sulphides is subjected to the action of sulphur dioxide at elevated temperatures, the sulphur dioxide and ferrous sulphide or pyrites react to produce ferric oxide and elemental sulphur in accordance with the following equations:

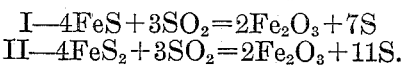

I—$4FeS + 3SO_2 = 2Fe_2O_3 + 7S$
II—$4FeS_2 + 3SO_2 = 2Fe_2O_3 + 11S$.

The foregoing reactions normally occur very slowly. We have found that the reactions are materially accelerated when conducted in the presence of certain metal salts containing oxygen. Among the metal salts which we have used successfully under suitable conditions are alkaline earth metal compounds such as magnesium oxide, magnesium sulphite, magnesium sulphate, magnesium carbonate, calcium oxide and calcium sulphite; heavy metal oxides such as ferric oxide; and aluminum oxide. The aforementioned compounds may be used alone or they may be used as mixtures in which the various components are present in any desired proportions. We have found that magnesium oxide and mixtures of compounds including magnesium oxide may be used to particular advantage.

In conducting the reactions, it is desirable that intimate mixtures of the iron sulphite-bearing materials and the metal compounds containing oxygen be provided. For this reason, it is advisable to use materials in finely divided forms, preferably in which the particles are at least sufficiently small to pass a 40-mesh screen. It is unnecessary to provide particles smaller than sizes which will permit them to pass a 150 mesh screen. If desired the mixed mass of material to be exposed to the action of the sulphur dioxide may be moistened with water to form small lumps or aggregates to insure intimate contact and eliminate the entrainment of dust in the discharge gases.

A complete process of the invention involves mixing of finely divided iron sulphide-bearing material with one or more oxygen containing compounds, passage of sulphur dioxide in contact with the mixture, and recovery of the liberated sulphur. The sulphur dioxide may be obtained from any suitable source and the sulphur dioxide may be present in any desired concentration, but the gases containing the sulphur dioxide should not contain any material amount of free oxygen. The reactions proceed satisfactorily when either dilute or concentrated sulphur dioxide-bearing gases are employed.

We prefer to conduct the operations in externally heated retorts in order to provide accurate temperature control.

In treating mixtures containing different compounds different temperature conditions are required. In general temperatures as high as 800° C. may be used to produce satisfactory results. When magnesium compounds are used alone or in conjunction with other compounds temperatures between 600° C. and 800° C. may be employed.

The residue remaining after the separation of the sulphur may be treated by a water or air separating process to recover the oxygen containing compound for reuse and to provide an iron oxide product for any suitable further treatment desired.

The invention will be better understood from a consideration of the following description of a process involving the treatment of pyrites with sulphur dioxide in the presence of magnesium oxide.

An intimate mixture of pyrites and magnesium oxide is introduced in a finely divided condition, or in the form of small lumps or agglomerates, into the interior of a rotary reaction chamber having ore charging means at one end and discharging means at the other end, and which is so constructed and operated that the material is gradually moved from the charging end toward the discharge end. Heating means are provided within or exteriorly of the chamber to permit accurate temperature control. Sulphur dioxide alone or mixed with the usual contaminating gases other than oxygen in any material amount is introduced into the reaction chamber at the end opposite to that at which the mixture of pyrites and magnesium oxide is introduced and the sulphur dioxide and the mixture of pyrites and magnesium oxide pass through the chamber in countercurrent relationship. The pyrites and magnesium oxide are ground to provide particles at least sufficiently small to pass a 40-mesh screen and preferably sufficiently small to pass a 100 mesh screen in order that intimate contact of the sulphur dioxide and the magnesium oxide with the pyrites may be obtained.

The process is preferably so controlled that a temperature of about 600° C. to 650° C. is maintained in the reaction chamber. The sulphur dioxide is introduced into the reaction chamber in any desired concentration. The sulphur dioxide and sulphides of iron react to produce elemental sulphur and ferric oxide. The process may be so controlled that the magnesium oxide remains substantially unaffected at the end of the reaction. The magnesium oxide may be changed physically and a portion may be converted to the sulphate form. The admission of pyrites and sulphur dioxide is preferably so regulated that all of the sulphur liberated is vaporized as elemental sulphur, substantially all of the sulphur dioxide admitted is reduced, and substantially all of the pyrites is converted to ferric oxide.

The sulphur produced is vaporized and removed from the reaction chamber at a point near the charging end, and the residue containing the ferric oxide and magnesium oxide is discharged continuously. The vaporized sulphur is collected and condensed.

The hot residue containing the ferric oxide and magnesium oxide is preferably subjected to an air separating operation to recover the magnesium oxide which may be used in the treatment of additional pyrites. It is unnecessary to make a clean separation of the ferric oxide from the magnesium oxide as the presence of ferric oxide in the magnesium oxide used for promoting the reaction is beneficial or, at least, not harmful.

We claim:—

1. The method of recovering elemental sulphur which comprises subjecting iron sulphide to the action of sulphur dioxide at a suitably elevated temperature in the presence of one or more magnesium compounds.

2. The method of recovering elemental sulphur which comprises subjecting iron sulphide to the action of sulphur dioxide at a suitably elevated temperature in the presence of magnesium oxide.

3. The method of recovering elemental sulphur which comprises subjecting iron sulphide to the action of sulphur dioxide at a suitably elevated temperature in the presence of a magnesium salt of an acid of sulphur.

4. The method of recovering elemental sulphur which comprises subjecting iron sulphide to the action of sulphur dioxide at a suitably elevated temperature in the presence of magnesium carbonate.

In testimony whereof we affix our signatures.

RAYMOND F. BACON.
ISAAC BENCOWITZ.